United States Patent [19]

Tamaki

[11] 4,320,834
[45] Mar. 23, 1982

[54] REEL CONTAINER
[75] Inventor: Tohru Tamaki, Sagamihara, Japan
[73] Assignee: Minnesota Mining and Manufacturing Company, St. Paul, Minn.
[21] Appl. No.: 145,027
[22] Filed: Apr. 30, 1980
[51] Int. Cl.³ .................. B65D 45/00; B65D 85/57; G11B 23/02; E05C 1/10
[52] U.S. Cl. .................................. 206/404; 206/1.5; 206/405; 292/175
[58] Field of Search ............... 206/404, 405, 406, 1.5; 292/175, 163

[56] References Cited
U.S. PATENT DOCUMENTS
3,661,250 5/1972 Lyman .............................. 206/405
3,841,674 10/1974 Bisbing et al. ...................... 292/175
4,223,787 9/1980 Lowry et al. ...................... 206/1.5

Primary Examiner—William T. Dixson, Jr.
Attorney, Agent, or Firm—Cruzan Alexander; Donald M. Sell; William L. Huebsch

[57] ABSTRACT

A reel storage container comprising a body including a central post having a generally mushroom-shaped head; a cover having an elongate handle extending diagonally across its center; and a latching member mounted within the handle for longitudinal sliding movement between a release position and a latching position to which it is biased. The latching member will engage the mushroom-shaped head in its latching position, will cam around and engage the mushroom-shaped head when the body and cover are assembled, and is manually engageable through an opening in the handle so that the latching member can be manually moved to its release position to open the container.

1 Claim, 9 Drawing Figures

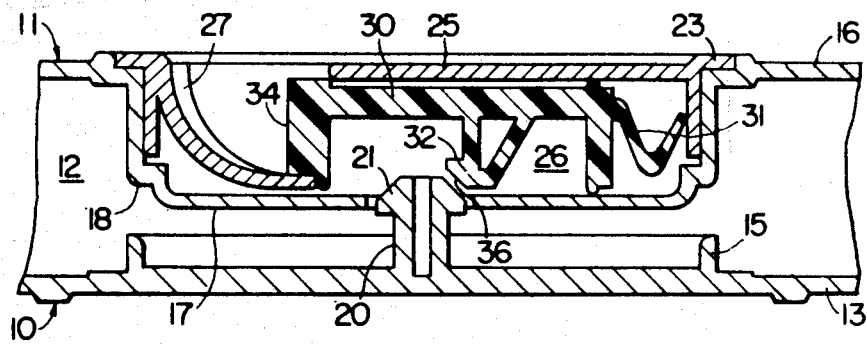

REEL CONTAINER

TECHNICAL FIELD

This invention relates to reel containers.

BACKGROUND ART

Reel containers typically comprise a body and a cover which define an annular chamber adapted to receive a reel, and a centrally located latch assembly for releasably coupling the body and cover together. Such latch assemblies typically include a latch member mounted on the cover for movement between a latching position in engagement with the body when the body and cover are assembled, and a releasing position affording separation or assembling of the body and cover.

Such latch assemblies on known reel containers have not been as easy to release with one hand as may be desired to open the containers, and have required manual manipulation of the latch members to move their to their engage positions after the body and cover portions have been assembled. This can be inconvenient.

DISCLOSURE OF INVENTION

The present invention provides an inexpensive latch assembly for a reel container that can be easily operated by one hand to remove a cover of the container, and which latch assembly is self-engaging when the cover is again assembled with a body of the container.

The latch assembly in a reel container according to the present invention comprises a post fixed centrally on the body of the container, which post extends toward the cover when the body and cover are assembled, and has a generally mushroom-shaped head at its end. The cover has walls defining an elongated handle extending across the center of the cover, which handle is adapted for engagement from the outer surface of the cover, has a channel along its surface and has an opening into the channel adjacent one end. The latching member is mounted within the channel for sliding movement between a release position and a latching position and is biased to its latching position by biasing means. The latch member includes a projection adapted to engage under the head on the post when the latching member is in its latching position, and has a cam on the projection adapted to engage the end surface of the mushroom-shaped head and move the latching member toward its release position and around the head in opposition to the biasing means when the body and cover are assembled. Also the latching member has a contact surface adapted for manual engagement through the opening by one finger of a hand grasping the handle to push the latching member to its release position so that the cover can be removed from the body.

BRIEF DESCRIPTION OF DRAWING

The invention will be further described with reference to the accompanying drawing wherein like numbers refer to like parts in the several views, and wherein.

DETAILED DESCRIPTION

Figure 1:
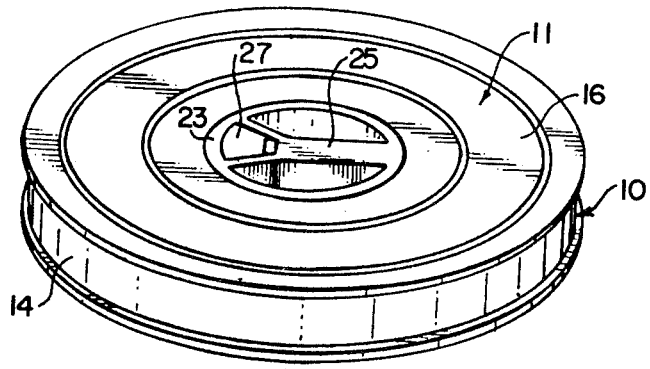
FIG. 1 is a perspective view of a reel container including a latch assembly according to the present invention.
Figure 2:
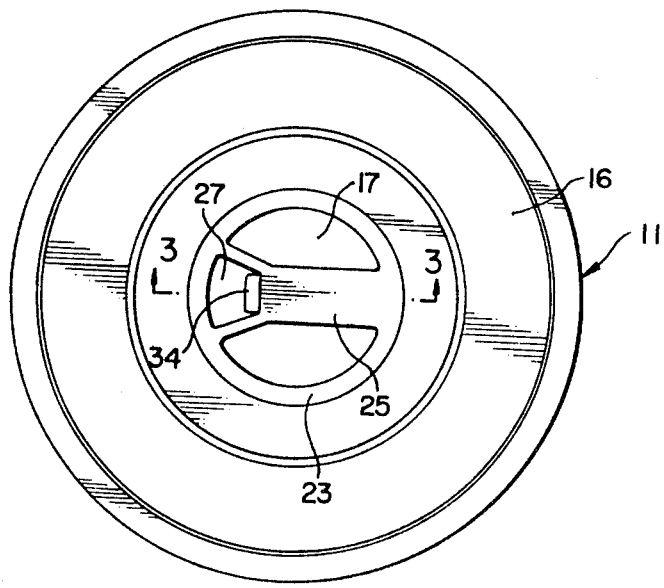
FIG. 2 is a top view of the reel container of FIG. 1.

Referring now to the drawing, there is shown a reel container according to the present invention comprising a body 10 and a cover 11 adapted to be releasably assembled to define an annular chamber 12 adapted to receive a reel, and a central latch assembly for releasably coupling the body 10 and cover 11 together.

The body 10 comprises a circular side wall 13 from which projects a cylindrical edge wall 14 and a concentric cylindrical inner sealing wall 15; and the cover 11 comprises a circular side wall 16 having an annular groove around its periphery adapted to receive and seal around the end of the edge wall 14 a generally planar top surface, and a concentric inner dish-shaped wall 17 recessed from the top surface and having a lip 18 adapted to engage seal against the end of the sealing wall 15 of the body 10 when the body 10 and cover 11 are assembled to restrict entrance of dust into the chamber 12.

Figure 3:
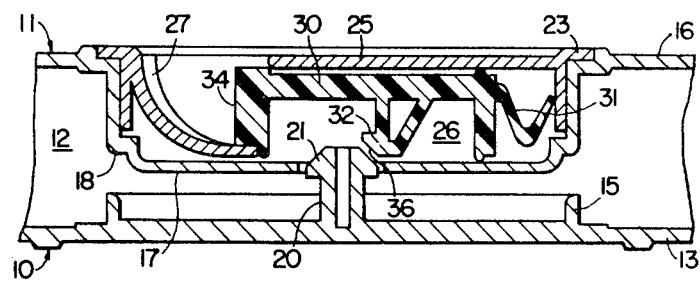
FIGS. 3, 4 and 5 are enlarged fragmentary sectional views taken approximately along the lines 3—3 of FIG. 2 which sequentially illustrate movement of a latch member in the latch assembly as a body and cover of the reel container are assembled.
Figure 5:
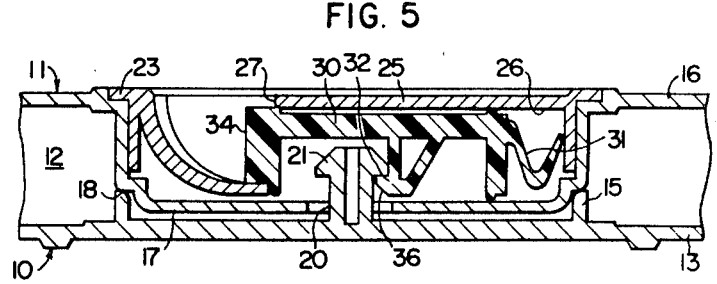
Figure 6:
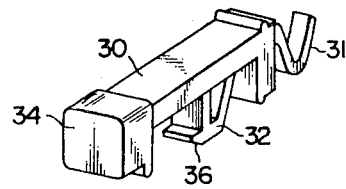
FIG. 6 is a perspective view of the latch member shown in FIGS. 3, 4 and 5.
Figure 7:
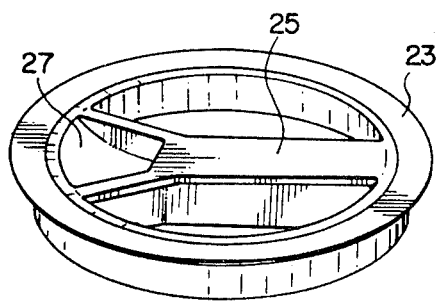
FIG. 7 is a perspective view of a part of the latch assembly which is included in the cover of the reel container.
Figure 8:
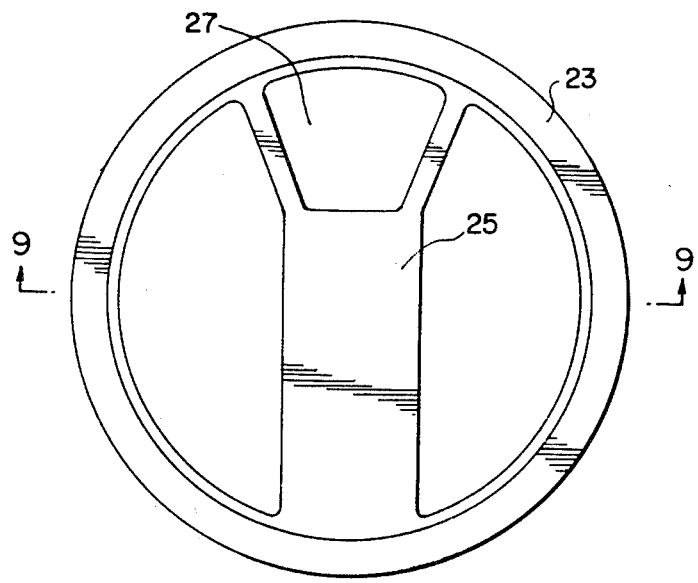
FIG. 8 is a top view of the part illustrated in FIG. 7.
Figure 9:
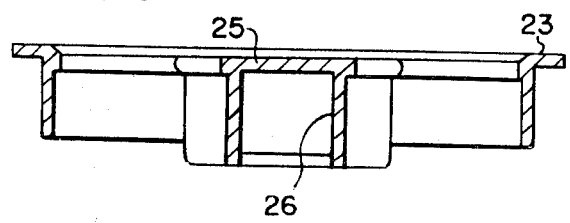
FIG. 9 is a sectional view taken along the lines 9—9 of FIG. 8.

The latch assembly comprises a post 20 fixed centrally on the body 10. The post 20 projects through a central opening in the dish-shaped wall 17 when the body 10 and cover 11 are assembled, and has a generally mushroom-shaped head 16 at its end. A generally circular latch assembly part 23 is fixed within the dish-shaped wall 17 of the cover 11. The latch assembly part 23 has transversely extending walls defining a recessed handle 25 extending across the center of the cover 11, which handle 25 has side surfaces generally normal to the top surface of the cover adapted for manual engagement from the outer surface of the cover 11. The walls also define a channel 26 along the surface of the handle 25 adjacent the body 10 and have an opening 27 adjacent one end into the channel 26. A latching member 30 is mounted within the channel 26 for sliding movement between a latching position (FIGS. 3 and 5) to which it is biased by means comprising a resiliently flexible generally U-shaped spring 31 which bears against the cover 11 and is a portion of and integrally formed with the latching member 30 and at which latching position a hook-like projection 32 will engage under the head 21 on the part 20 when the cover 11 and body 10 are assembled (FIG. 5); and a release position at which the hook-like projection 32 will move past the side of the head 21 to allow the cover 11 to be removed from the body 10. The latching member 30 has an end contact surface 34 at its end opposite the spring 31. The contact surface 34 is disposed generally transverse of the side surfaces of the handle 25 and generally normal to the top surface of the cover 11 so that it can be readily reached through the opening 27 in the handle 25 and pushed to its releasing position by the index finger of a hand grasping the handle 25 and the container can easily be opened with one hand.

Figure 4:
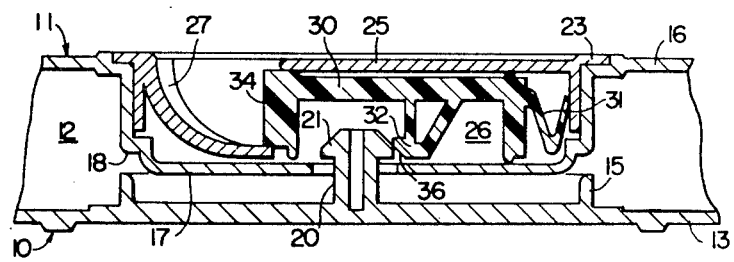

Also, the hook-like projection 32 has a cam surface 36 adapted to engage the end surface of the mushroom-shaped head 21 and move the latching member 30 toward its release position and around the mushroom-shaped head 21 as the cover 11 is assembled with the body 10 (see FIGS. 3, 4 and 5) whereupon the projection 32 will be moved under the head 21 by the influence of the spring 31 so that the latch assembly is self-engaging as the cover 11 is assembled on the body 10.

As illustrated, the container can be made in four moldings, one of which forms the latching member 30 including the spring 31, another of which forms the entire body 10, another of which forms the side wall 16 and dish-shaped wall 17 included in of the cover 11, and the last of which forms the latch assembly part 23 also included in the cover 11.

I claim:

1. In a reel storage container comprising a body and a cover defining a chamber adapted to receive a reel, said cover having a generally planar top surface, a central recess from said top surface, and walls defining an elongate handle extending across said recess, said handle having said surfaces generally normal to said top surface adapted for manual engagement from the outer surface of said cover, and having a channel along its surface adjacent said body and an opening into said channel adjacent one end; a centrally located latch assembly for releasing coupling the body and cover together, said latch assembly including a central post fixed on said body and projecting into the channel in said handle when said body and cover are assembled which post has a generally mushroom-shaped head at its end, and a latching member mounted on said cover within said channel for movement between latching and release positions having a projection adapted to engage under said mushroom-shaped head when said latching member is in said latching position and the body and cover are assembled, a cam surface on said projection adapted to engage the end surface of said mushroom-shaped head and move said latching member toward its release position when said projection is moved past said mushroom-shaped head as said body and cover are assembled, and a contact surface positioned for manual engagement through said opening to move said latching member to said release position; and a spring integrally molded with said latch assembly for biasing said latching member toward said engaging position, the improvement wherein:

said latching member is slidably mounted within said channel between said latching and release positions in a position recessed from said top surface;

said spring is formed at the end of said latching member opposite said contact surface and bears against said cover; and said contact surface positioned for manual engagement through said opening to move said latching member to said release position is disposed generally transverse of the side surfaces of said handle and generally normal to the top surface of said cover.

* * * * *

UNITED STATES PATENT AND TRADEMARK OFFICE
CERTIFICATE OF CORRECTION

PATENT NO. : 4,320,834
DATED : March 23, 1982
INVENTOR(S) : Tohru Tamaki

It is certified that error appears in the above-identified patent and that said Letters Patent is hereby corrected as shown below:

Col. 3, line 21, "said handle having said surfaces" should read --said handle having side surfaces--.

Col. 3, line 26, "releasing coupling the body" should read --releasably coupling the body--.

Signed and Sealed this

Twenty-third Day of July 1985

[SEAL]

Attest:

DONALD J. QUIGG

Attesting Officer     Acting Commissioner of Patents and Trademarks